United States Patent [19]

Sheehan et al.

[11] Patent Number: 4,748,801
[45] Date of Patent: Jun. 7, 1988

[54] SYSTEM FOR AUTOMATICALLY CONTROLLING BALE SHAPE IN ROUND BALERS

[75] Inventors: Ronald T. Sheehan; Robert M. VanGinhoven, both of Lancaster; Stephen C. Schlotterbeck, New Holland, all of Pa.

[73] Assignee: New Holland Inc., New Holland, Pa.

[21] Appl. No.: 37,490

[22] Filed: Apr. 13, 1987

[51] Int. Cl.⁴ ............................................. A01D 39/00
[52] U.S. Cl. ............................. 56/341; 56/DIG. 15
[58] Field of Search ............... 56/10.2, DIG. 15, 341; 100/88

[56] References Cited

U.S. PATENT DOCUMENTS

| | | | |
|---|---|---|---|
| 4,065,914 | 1/1978 | Phillips et al. | 56/341 |
| 4,224,867 | 9/1980 | Gaeddert et al. | 56/341 |
| 4,433,533 | 2/1984 | Giani | 56/341 |
| 4,517,795 | 5/1985 | Meiers | 56/341 |
| 4,658,573 | 4/1987 | VanGinhoven | 56/341 |
| 4,686,820 | 8/1987 | Andra et al. | 56/341 |
| 4,702,066 | 10/1987 | Newendorp et al. | 56/10.2 |

*Primary Examiner*—Paul J. Hirsch
*Attorney, Agent, or Firm*—Darrell F. Marquette; Frank A. Seemar; Larry W. Miller

[57] ABSTRACT

A bale shape controlling system for round balers is disclosed. The system includes first and second indicator lights, and bale shape monitor apparatus for alternately generating signals in the indicator lights in response to predetermined expansion of the bale forming chamber of round balers. Typically round balers are operated in a manner whereby crop material is fed into only one side of the bale forming chamber at a time. The system also includes apparatus for automatically positioning round balers so that crop material is alternately fed into the right or left side of the bale forming chamber when signals are alternately generated in the indicator lights.

4 Claims, 4 Drawing Sheets

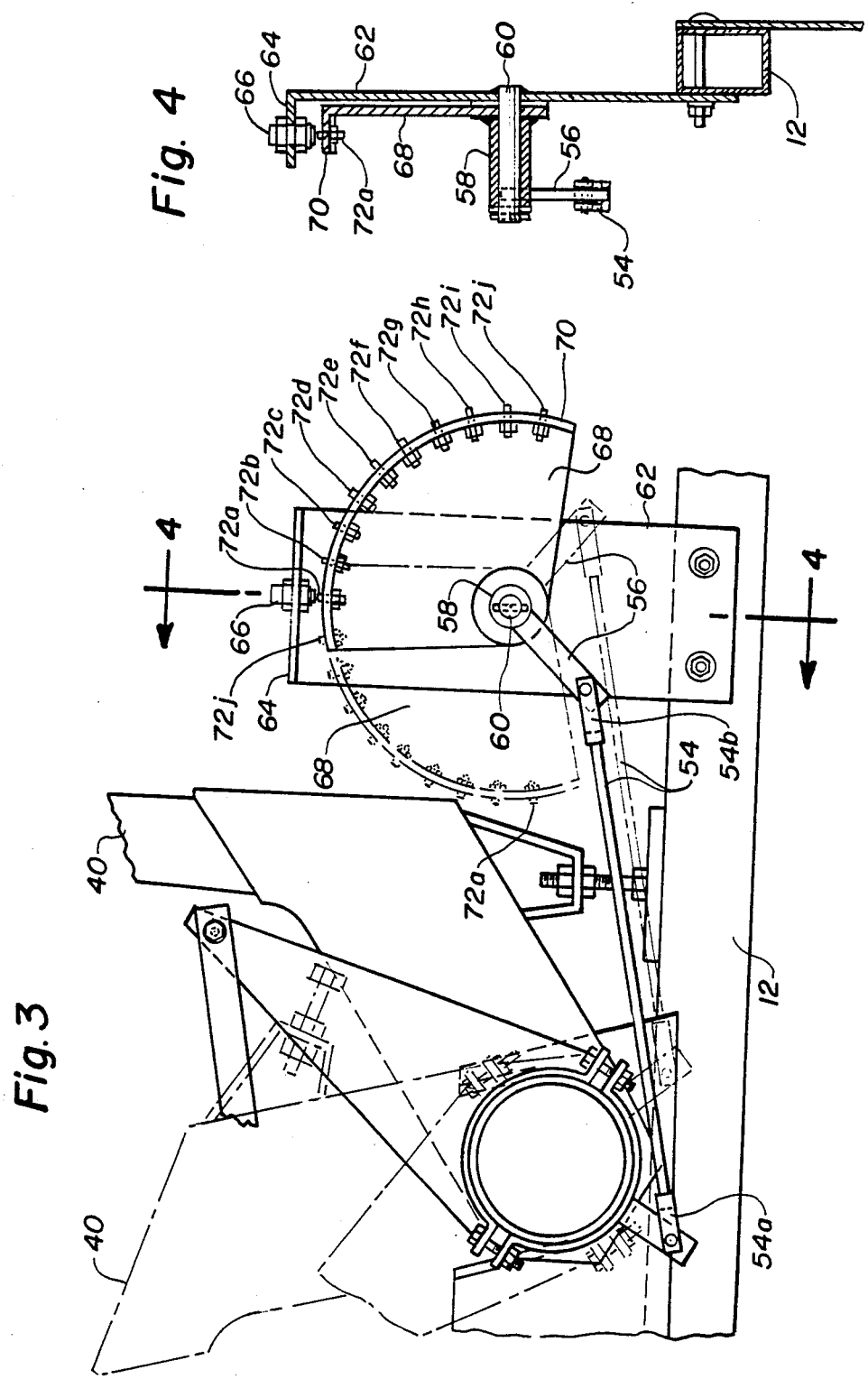

SYSTEM FOR AUTOMATICALLY CONTROLLING BALE SHAPE IN ROUND BALERS

BACKGROUND OF THE INVENTION

This invention relates generally to round balers and, in particular, to a system for automatically controlling bale shape in round balers.

During operation of a round baler, it is often necessary to weave the round baler back and forth in a zigzag pattern on the windrow of crop material being picked up and baled. This is because the windrows of crop material are typically much narrower in width than the pickups and the baling chambers of round balers. Without the weaving action, there is a tendency for the bales formed in round balers to be barrel-shaped or egg-shaped instead of uniformly cylindrical. Although the proper weaving of a round baler in a zigzag pattern overcomes the problem of poorly shaped bales, it requires that the operator constantly remember when to weave the baler. This causes operator fatigue.

It is an object of the present invention to provide an automatic bale shape controlling system for round balers which prevents the formation of poorly shaped bales while reducing operator fatigue.

SUMMARY OF THE INVENTION

A system according to the present invention is intended for use in a round baler having an expandable bale forming chamber. The system includes first and second indicator means and single bale shape monitor means which generates a signal in the first indicator means in response to a predetermined expansion of the bale forming chamber. The bale shape monitor means subsequently generates a signal in the second indicator means in response to a further predetermined expansion of the bale forming chamber. The system also includes means for automatically positioning the round baler to feed crop material into one side of the bale forming chamber when a signal is generated in the first indicator means and into the other side of the bale forming chamber when a signal is generated in the second indicator means.

DESCRIPTION OF THE DRAWINGS

FIG. 3 is a further enlarged view of the bale shape monitor apparatus illustrated in FIG. 2;

FIG. 4 is a sectional view taken along lines 4—4 in FIG. 3;

DESCRIPTION OF THE PREFERRED EMBODIMENT

Figures 1, 2:
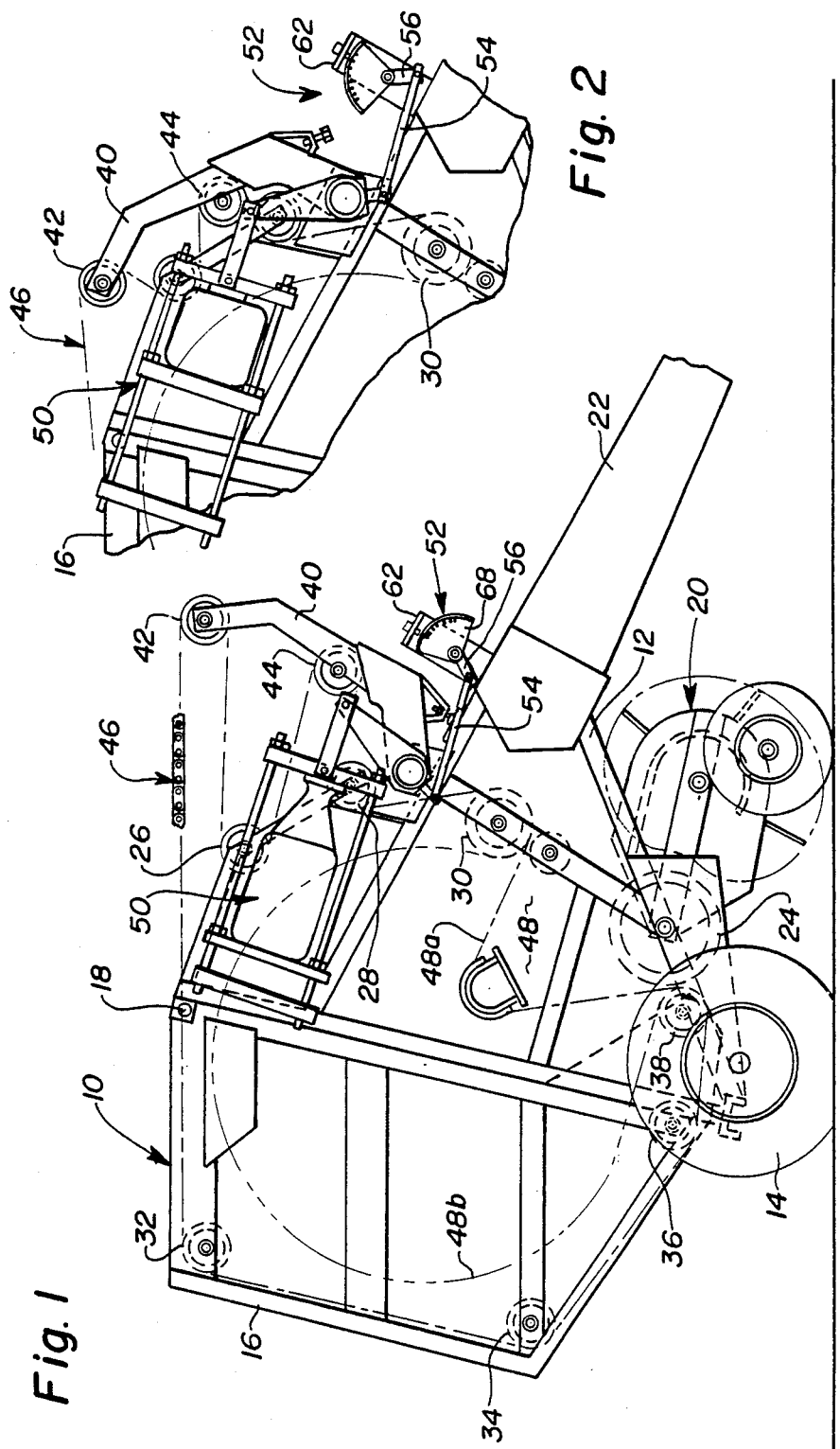
FIG. 1 is a right side elevation view of a round baler embodying a system according to the present invention.
FIG. 2 is an enlarged view of a portion of the round baler of FIG. 1 illustrating bale shape monitor apparatus.

Referring to FIG. 1, a round baler 10 is generally of the type disclosed in U.S. Pat. No. 4,426,833, incorporated herein by reference. The round baler 10 includes a base frame 12 supported by a pair of wheels 14 and an auxiliary frame or tailgate 16 pivotally connected to the base frame 12 by stub shafts 18. A pickup mechanism 20 is mounted on the base frame 12 for picking up windrowed crop material, and a tongue 22 provided on the base frame 12 is adapted for connection to a tractor.

A floor roller 24 and guide members 26,28,30 are rotatably mounted on the base frame 12, and guide members 32,34,36,38 are rotatably mounted in the tailgate 16. An arm assembly 40 is rotatably mounted on the base frame 12 for rotational movement between a forward position shown in FIG. 1 and a rearward position shown in FIG. 2. The arm assembly 40 carries further rotatable guide members 42,44.

A flexible bale forming apron 46 is movably supported on the aforementioned guide members. The apron 46 may be of the chain and slat type as illustrated in FIG. 1 or the flat belt type. Since both of these apron types are well known, no further description thereof will be provided. The apron 46 has an inner course extending between the guide members 30 and 38 to define a bale forming chamber 48 which is expandable during bale formation. When the baler 10 is empty, the apron inner course is disposed in a wedge-shaped bale starting position 48a and the arm assembly 40 which assists in supporting the apron 46 is disposed in its forward position shown in FIG. 1. As a bale is formed in the baler 10, the bale forming chamber 48 expands while the apron inner course expands in length around the bale and the arm assembly 40 is moved toward its rearward position. When a full size bale has been formed in the baler 10, the apron inner course is disposed in the full bale position 48b and the arm assembly 40 is moved to its rearward position shown in FIG. 2. Air spring assemblies 50 are connected between the base frame 12 and the arm assembly 40 to urge the arm assembly 40 toward its forward position of FIG. 1. This maintains a predetermined amount of tension in the apron 46 during bale formation in order to control the density of bales formed in the round baler 10.

Bale shape monitor apparatus 52 includes a link 54 pivotally connected at one end 54a to the arm assembly 40. The other end 54b of the link 54 is pivotally connected to a lever 56 as best seen in FIGS. 3 and 4. The lever 56 is fixed to a sleeve 58 which is rotatably mounted on a stub shaft 60. The stub shaft 60 is fixed to a bracket 62 that is bolted to the base frame 12. The flange portion 64 of the bracket 62 supports a magnetically activated switch 66 such as part No. 103SR12A-1 manufactured by Microswitch Inc. This particular type of switch 66 is commonly referred to as a hall effect switch. A plate 68 is fixed to the sleeve 58 and the arcuate flange portion 70 thereof supports a plurality of magnets 72a-72j.

Figure 5:
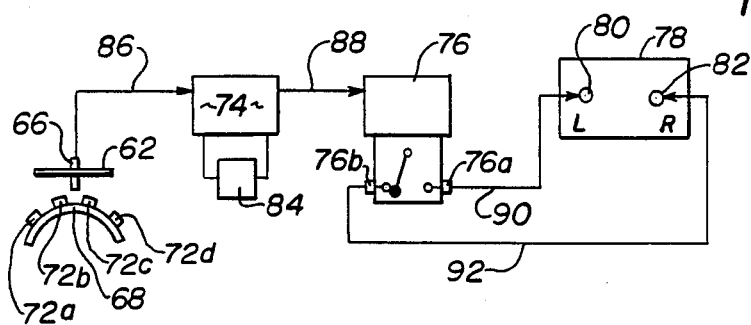
FIG. 5 is a schematic view of a bale shape monitoring system.

Referring to FIG. 5, a system which incorporates the bale shape monitor apparatus 52 includes a time delay 74 such as part No. KD118 manufactured by Instrumentation and Control Systems Inc., a latching relay 76 such as part No. S89R11DBD1 manufactured by Potter and Brumfield, and an operator panel 78 with left and right indicator lights 80 and 82, respectively. The time delay 74 may be provided with an adjustable resistor 84 to allow adjustment of the time delay 74 in a preselected range of, for example, 0.1 second to 10 seconds. The input of the time delay 74 is connected to the switch 66 by wiring 86, and the output of the time delay 74 is connected to the latching relay 76 by wiring 88. One terminal 76a of the latching relay 76 is connected by wiring 90 to the left indicator light 80 on the control panel 78 while the other terminal 76b of the latching relay 76 is connected by wiring 92 to the right indicator light 82 on the operator panel 78.

When the inner course of the apron 46 is in its bale starting position 48a and the arm assembly 40 is in its forward position as shown in FIG. 1, the various parts of the bale shape monitor apparatus 52 will be disposed in the positions shown in full lines in FIG. 3. The plate 68 will be positioned so that the first magnet 72a is in alignment with the switch 66. The clearance between magnet 72a and the switch 66 is preferably between 1/16 inch and ¼ inch. Activation of the system of FIG. 5 causes the right indicator light 82 to be illuminated while the left indicator light 80 is extinguished.

Figure 6:
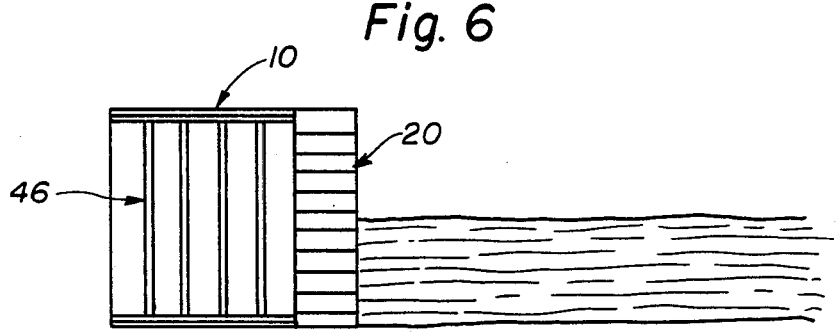
FIGS. 6 and 7 are diagrammatic plan views of a round baler during operation thereof utilizing the system illustrated in FIG. 5.

The operator then starts towing the baler 10 across a field along a windrow of crop material with the pickup 20 aligned to feed crop material into the right side of the bale forming chamber 48 as illustrated in FIG. 6. As the crop material is formed into a roll bale in the bale forming chamber 48, the inner course of apron 46 expands in length and the arm assembly 40 rotates from its forward position shown in FIG. 1 toward its rearward position shown in FIG. 2. This rotation of the arm assembly 40 causes rotation of the plate 68 carrying the magnets 72a-72j in a counterclockwise direction in FIG. 3. When the plate 68 is rotated far enough so that the second magnet 72b (to the right of magnet 72a in FIG. 3) becomes aligned with the switch 66, a signal is sent via the wiring 86 to activate the time delay 74. If the second magnet 72b remains aligned with the switch 66 during the entire period of time (for example, 1 to 2 seconds) for which the time delay 74 is set, a signal is sent via the wiring 88 to actuate the latching relay 76. The latching relay 76 will then toggle from terminal 76b to terminal 76a thereby illuminating the left indicator light 80 via the wiring 90 and simultaneously extinguishing the right indicator light 82.

Figure 7:
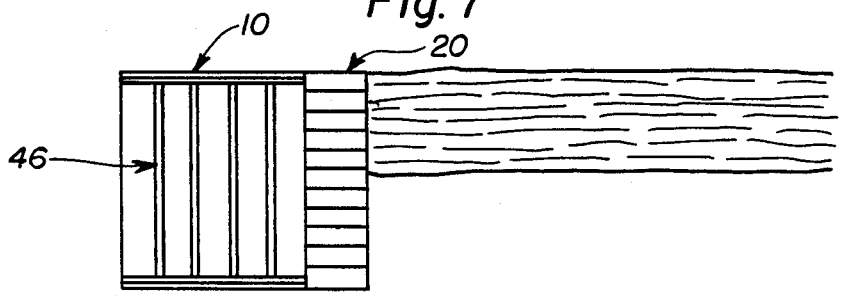

The operator then weaves the baler 10 toward the right along the windrow of crop material so that the pickup 20 is aligned to feed crop material into the left side of bale forming chamber 48 as illustrated in FIG. 7. As bale formation continues in the bale forming chamber 48, the arm assembly 40 continues to rotate toward its rearward position shown in FIG. 2 thereby causing further rotation of the plate 68 which is connected to the arm assembly 40 by the link 54 and the lever 56. This further rotation of the plate 68 results in the third magnet 72c (to the right of magnet 72b in FIG. 3) becoming aligned with the switch 66. A signal is again sent via the wiring 86 to activate the time delay 74. Should the third magnet 72c remain in alignment with the switch 66 for the duration of the setting of the time delay 74, another signal will be sent via the wiring 88 to cause the latching relay 76 to toggle back from terminal 76a to terminal 76b. This results in reillumination of the right indicator light 82 and simultaneous extinguishing of the left indicator light 80. The operator subsequently weaves the baler 10 back toward the left along the windrow of crop material so that the pickup 20 is again aligned to feed crop material into the right side of the bale forming chamber 48.

As bale formation continues in the bale forming chamber 48, the arm assembly 40 will continue to be rotated toward its rearward position shown in FIG. 2. This rotation of the arm assembly 40 will cause the left and right indicator lights 80 and 82, respectively, to be alternately illuminated by the bale shape monitor apparatus 52. Consequently, the operator will be given an indication or signal when to weave the baler 10 to feed crop material into the other side of the bale forming chamber 48 of the baler 10. It will be understood that proper use of the system shown in FIG. 5 results in the formation of bales which are uniformly cylindrical.

The purpose of the time delay 74 is to prevent a false signal which may be caused by a bouncing motion of the arm assembly 40. During bale formation, the arm assembly 40 normally rotates smoothly from its forward position shown in FIG. 1 toward its rearward position shown in FIG. 2. However, under adverse conditions such as in the event of an egg-shaped bale, the arm assembly 40 may bounce back and forth during its rotational movement. In order to insure that the arm assembly 40 has rotated to a new position and is not in a bouncing motion, each of the magnets 72a-72j must remain aligned with the switch 66 for the entire duration of the time setting of the time delay 74 or the time delay 74 will be automatically reset and there will be no change in the indicator lights 80 and 82.

Figure 8:
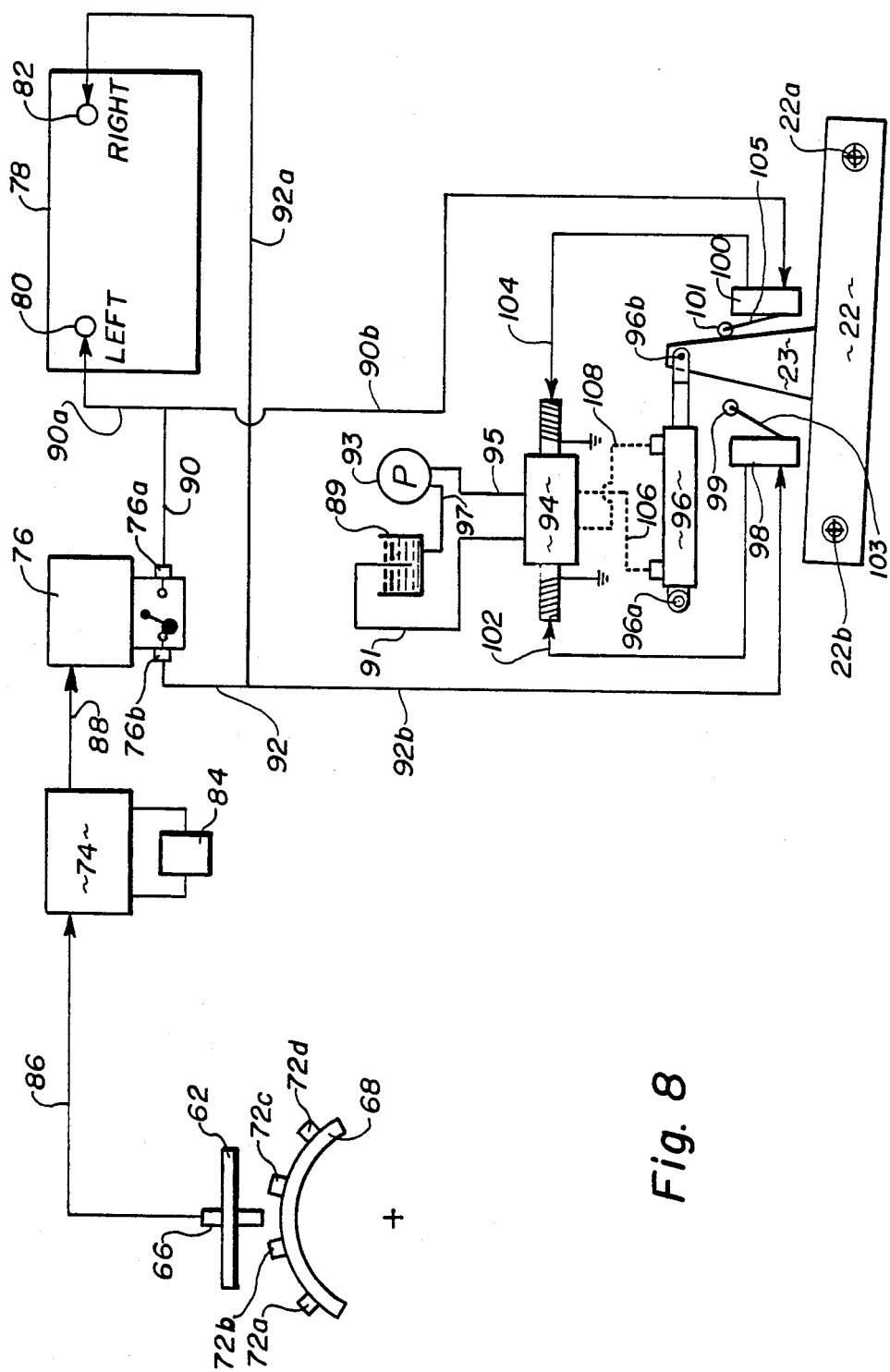
FIG. 8 is a schematic view of a system according to the present invention.

Referring to FIG. 8, there is illustrated a system for automatically controlling bale shape which incorporates the bale shape apparatus 52 and the system of FIG. 5. The system shown in FIG. 8 includes a solenoid actuated spool valve 94 such as part no. 644122 available from Control Concepts, Inc., a hydraulic cylinder unit 96 of the double acting type, and a pair of limit switches 98 and 100 such as part no. 467820 available from Microswitch, Inc. The terminal 76a of the latching relay 76 is connected by wiring 90,90a to the left indicator light 80 on the operator panel 78 and by wiring 90,90b to the input of limit switch 100. The other terminal 76b of the latching relay 76 is connected by wiring 92,92a to the right indicator light 82 on the operator panel 78 and by wiring 92,92b to the input of the limit switch 98. The outputs of the limit switches 98 and 100 are connected to the valve 94 by wiring 102 and 104, respectively. The valve 94 is connected to the opposite ends of the hydraulic cylinder 96 by fluid conduits 106,108. The valve 94 is also connected to a reservoir 89 by a fluid conduit 91 and to a pump 93 by a fluid conduit 95. The pump 93 is connected to the reservoir 89 by a fluid conduit 97.

One end 96a of hydraulic cylinder unit 96 is pivotally connected to the baler frame 12 while the other end 96b thereof is pivotally connected to a plate 23 attached to the baler tongue 22. In this embodiment, one end 22a of the tongue 22 is pivoted to the tractor (not shown) and the other end 22b of the tongue 22 is pivoted to the frame 12. The limit switches 98,100 are supported by the frame 12 so that rollers 99,101 may be engaged by the plate 23. The rollers 99,101 are carried on spring loaded arms 103,105 which serve to open the limit switches 98,100 when depressed.

It will be understood from the foregoing description that when the latching relay 76 in FIG. 8 is toggled from terminal 76a to terminal 76b, the right indicator light 82 is illuminated and the left indicator light 80 is extinguished. Simultaneously, a signal is sent via the wiring 92,92b to the limit switch 98 which is closed. The limit switch 98 transmits this signal via wiring 102 to the valve 94 which is actuated by its solenoid to cause conduit 106 to communicate with conduit 91 and to cause conduit 108 to communicate with conduit 95. Fluid is drawn from the reservoir 89 by the pump 93 via the conduit 97 and then delivered by the pump 93 to one end of the hydraulic cylinder unit 96 via the conduits 95,108. Fluid is simultaneously returned from the other end of the hydraulic cylinder unit 96 to the reservoir 89 via the conduits 106,91. This causes contraction of the hydraulic cylinder unit 96 thereby pivoting the baler tongue 22 in a direction to automatically weave the baler 10 toward the right along the windrow of crop material until the pickup 20 is positioned to feed crop material into the left side of the bale forming chamber 48 as shown in FIG. 7. When the tongue 22 has pivoted far enough to cause plate 23 to contact the roller 99 and thereby fully depress the arm 103, the limit switch 98 is opened. This causes the valve 94 to close both of the conduits 106,108. Further contraction of the hydraulic cylinder unit 96 ceases and the tongue 22 remains in the same location.

Bale formation continues in the bale forming chamber 48, as previously described, thereby causing rotation of the arm assembly 40 and simultaneous rotation of the plate 68 in a manner which causes the latching relay 76 to toggle from terminal 76b to terminal 76a. The right indicator light 82 is extinguished and the left indicator light 80 is illuminated. Simultaneously, a signal is sent via the wiring 90,90b to the limit switch 100 which is closed. The limit switch 100 transmits this signal via wiring 104 to the valve 94 which is actuated by its solenoid to cause conduit 106 to communicate with conduit 95 and to cause conduit 108 to communicate with conduit 91. Fluid is drawn from the reservoir 89 by the pump 93 via the conduit 97 and then delivered by the pump 93 to the hydraulic cylinder unit 96 via the conduits 95,106. Fluid is simultaneously returned from the hydraulic cylinder unit 96 to the reservoir 89 via the conduits 108,91. This causes extension of the hydraulic cylinder unit 96 thereby pivoting the baler tongue 22 in the opposite direction to automatically weave the baler 10 toward the left along the windrow of crop material until the pickup 20 is positioned to feed crop material into the right side of the bale forming chamber 48 as shown in FIG. 6. When the tongue 22 has pivoted far enough to cause plate 23 to contact the roller 101 and thereby fully depress the arm 105, the limit switch 100 is opened. This causes the valve 94 to close both of the conduits 106,108. Further extension of the hydraulic cylinder unit 96 ceases and the tongue 22 remains in the same location.

As bale formation continues in the bale forming chamber 48, the baler 10 will be automatically weaved back and forth to position the baler 10 to alternately feed crop material into the right and left sides of the bale forming chamber 48. It will be understood that proper use of the system of FIG. 8 automatically results in the formation of bales which are uniformly cylindrical. Accordingly, the present invention prevents formation of poorly shaped bales while reducing operator fatigue.

Having thus described the invention, what is claimed is:

1. In combination with a round baler having a bale forming chamber which is expandable during bale formation, a system comprising:
   first and second indicator means;
   single bale shape monitor means for generating a signal in said first indicator means in response to a predetermined expansion of said bale forming chamber, said single bale shape monitor means subsequently generating a signal in said second indicator means in response to a further predetermined expansion of said bale forming chamber, said signals being alternately generated by said single bale shape monitor means; and
   means for automatically positioning the round baler to feed crop material into one side of said bale forming chamber when a signal is generated in said first indicator means and into the other side of said bale forming chamber when a signal is alternately generated in said second indicator means.

2. The system of claim 1, wherein said automatically positioning means comprises a hydraulic cylinder unit, and a valve for controlling fluid flow to said hydraulic cylinder unit for causing contraction and extension of said hydraulic cylinder unit.

3. The system of claim 2, wherein said automatically positioning means further comprises a pair of limit switches for operating said valve when the signals are generated in said indicator means.

4. The system of claim 3, wherein one of said limit switches operates said valve in a manner to cause contraction of said hydraulic cylinder unit when a signal is generated in said first indicator means, and wherein the other one of said limit switches operates said valve to cause extension of said hydraulic cylinder unit when a signal is generated in said second indicator means.

* * * * *